May 22, 1956 K. DOLEZAL 2,746,087
METHOD OF MANUFACTURE OF SPECTACLES
Filed Sept. 18, 1951 2 Sheets-Sheet 1
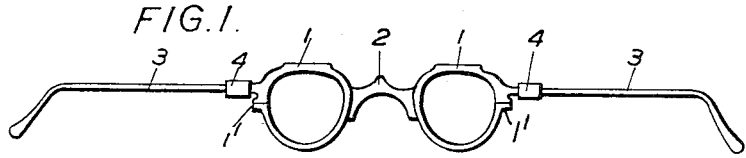
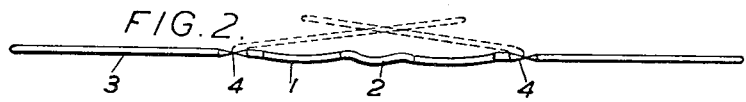
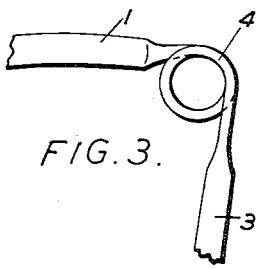
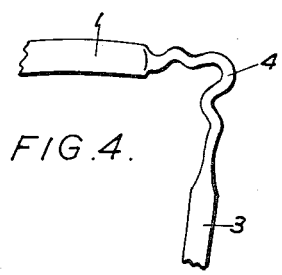
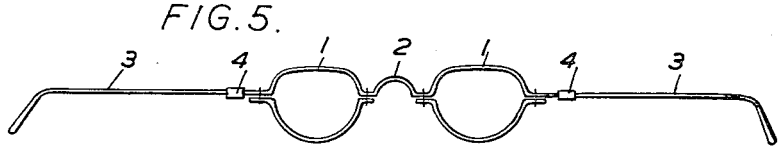
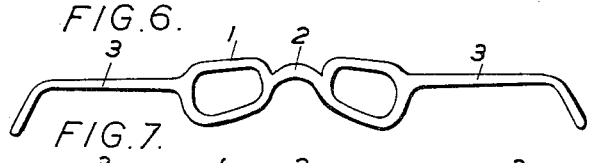
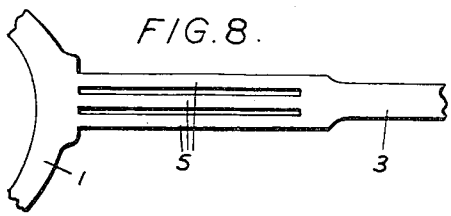
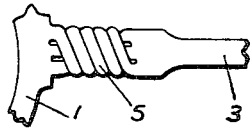
Inventor
Karel Dolezal
By John E Eastlack
Attorney

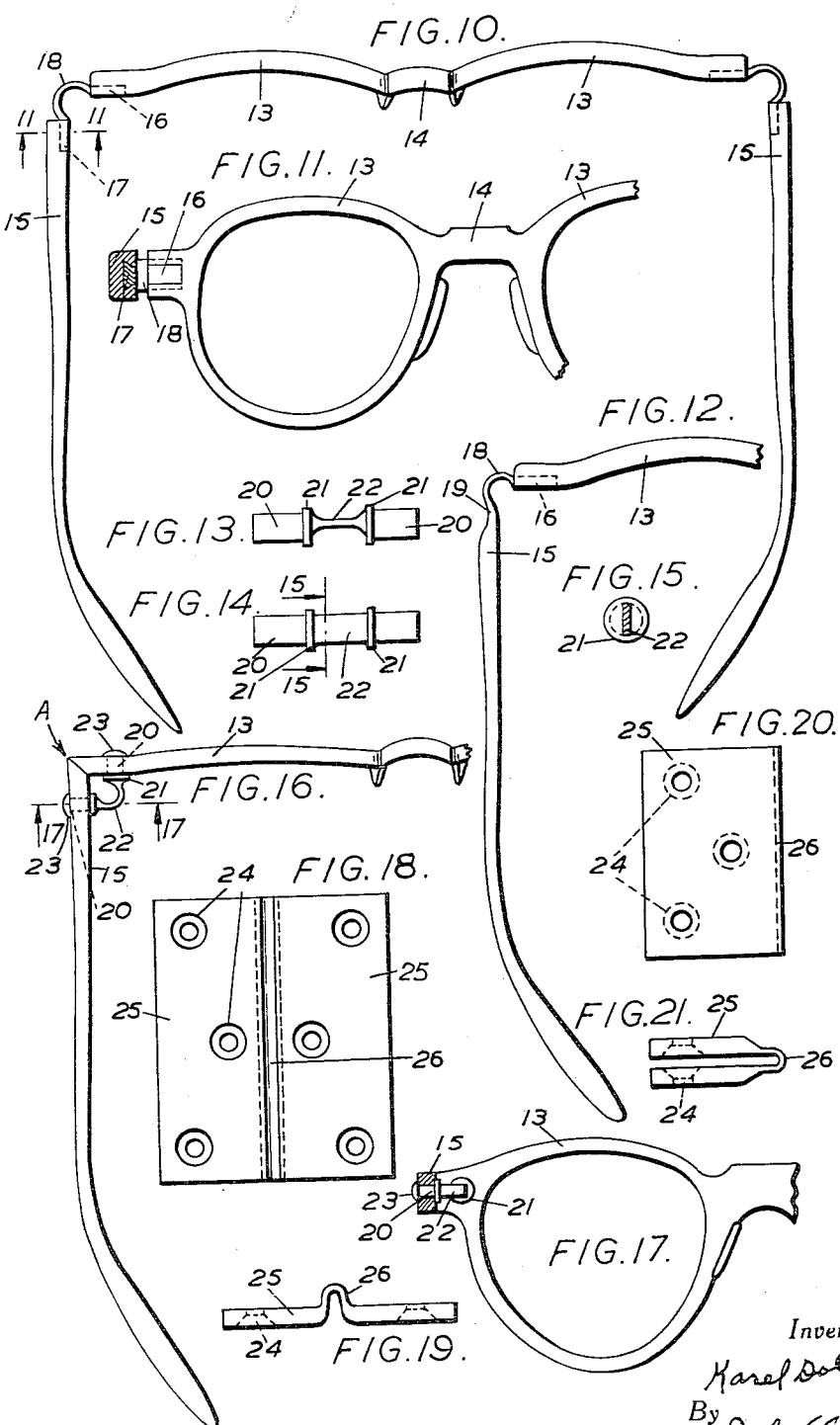

United States Patent Office 2,746,087
Patented May 22, 1956

2,746,087

METHOD OF MANUFACTURE OF SPECTACLES

Karel Doležal, Prague, Czechoslovakia

Application September 18, 1951, Serial No. 247,087

Claims priority, application Czechoslovakia May 7, 1948

13 Claims. (Cl. 18—48)

This invention relates to the manufacture of hinges, especially the hinges of spectacles, although hinges according to the invention may be used for other purposes, and the application is a continuation-in-part of my application filed January 24, 1949, Serial Number 72,473, now abandoned.

An object of the present invention is to provide spectacle and other hinges made of a plastic capable of molecular orientation by cold working, each hinge consisting of outer portions and an intermediate portion which is molecularly orientated by cold working it to the sectional shape of a flat band in order to render it strong and resilient, whereas the outer portions, one or both of which serve for connection of the hinge to the component or components to be hinged, are left substantially unorientated and therefore rigid.

As plastics capable of molecular orientation by cold working the following synthetic linear high molecular materials are examples, namely: polyamides, polyurethanes, high molecular polyesters, polyvinylchloride and polyvinylidenechloride. Such plastics receive by molecular orientation an increased strength and resiliency in comparison with their non-orientated state, in which they are relatively stiff.

Connection between the cold worked hinges and the parts to be hinged may be effected in any appropriate way; e. g., by means of rivets or screws, by an adhesive, or by applying heat.

Other objects of the invention will be apparent from the following specification and claims.

Examples of spectacles and hinges according to the present invention are shown in the accompaying drawings, in which:

Fig. 1 is a front elevation and Fig. 2 a plan of the frame of a pair of spectacles incorporating the improved hinges.

Figs. 3 and 4 are fragmentary plans, to a larger scale, showing in detail alternative forms of hinges.

Figs. 5 and 6 are front elevations of other examples of spectacles and Fig. 7 is a plan of Fig. 6.

Figs. 8 and 9 are fragmentary views, to a larger scale, illustrating the production of another form of hinge connection.

Fig. 10 is a plan of the entire frame of a pair of spectacles, incorporating one form of hinges according to the invention, and Fig. 11 is a part sectional elevation, the section being on the line 11—11 of Fig 10.

Fig. 12 is a part plan of a spectacle frame incorporating a hinge of another form according to the invention.

Figs. 13, 14 and 15 are respectively a plan, an elevation and a section on the line 15—15 of Fig. 14 showing a hinge somewhat similar to the hinges used in the spectacles according to Figs. 10 and 11 or for other hinged parts.

Figs. 16 and 17, respectively are a part plan and a part sectional elevation, the section being on the line 17—17 of Fig. 16, of a spectacle frame incorporating hinges of yet another form.

Figs. 18 and 19, respectively, are a plan and end elevation of a hinge which may be used for any of different purposes.

Figs. 20 and 21 are views corresponding to Figs. 18 and 19 but showing another form of hinge.

Referring to Figs. 1 and 2, the spectacles consist of a pair of lenses mounted in the metal rims 1, connected by the bridge 2. The lenses are mounted in the rims in the customary way, each of the rims being divided at the place 1' and held together by a small screw (not shown). The sidepieces or temples 3 are directly connected to the rims 1, the part 4 adjacent their joint being reduced in cross-section by flattening, so that the part 4 is flexible and the temples can be folded, as about a hinge, with respect to the rims in a plane substantially parallel to the ophthalmic axis.

The part between the rim and temple may be formed in a different way. The temples 3 are bent back directly at the flattened part 4 taking, when not in use, the position indicated in Fig. 2 by dotted lines, so that the temples are urged towards each other when worn.

The resilient part 4 may, however, be arranged much longer and be bent according to Fig. 3 to a helix or according to Fig. 4 in wave form.

When the mountings are made of metal, the rims 1, the temples 3 and the bridge 2 may be made either separately and joined by welding or soldering, or the rims and temples may be made in one piece, and the bridge attached afterwards, or both temples, the upper parts of the rims and the bridge may be made in one piece, according to Fig. 5, the lower parts of the rims being fastened either by screws or by welding or soldering.

If artificial material such as plastics is used for manufacturing the mountings using pressing or die casting processes, a die is used advantageously for the whole mounting, the temples being arranged substantially in the same plane as the rims. A semi-product of this kind is shown in Figs. 6 and 7. The parts at the places where the temples join the rims are again reduced in cross-section by flattening either during the pressing or casting of the entire frame or in a subsequent operation, to the form shown at 4 in Figs. 2, 3 or 4, or it may be made in the form of a number of strips 5 according to Fig. 8 and bent back according to Fig. 2, 3 or 4, or in addition may be twisted according to Fig. 9. The lenses are thereafter mounted in the customary way.

The part 4 may, alternatively be provided with inserts of metal, textile threads or the like.

If a material is used for the manufacture of the mountings, as for instance linear polymers or polycondensates, the mechanical properties of which may be improved by molecular orientation by cold working, this property is used for the increase of strength and resiliency of the part 4 between the rim and temple. The cold working may be done either by drawing or twisting to the form shown in Fig. 9 or by pressing or rolling of this part. If a subsequent heating of the material is required to bend the temples back, whereby the molecular orientation would be disturbed, the cold working process is performed after the bending back of the temples. In this case, the pressing or rolling process is rather advantageous, especially the rolling process, where the orientation of the molecules take place mainly in the rolling direction. It is advantageous to let the material swell in a liquid bath before this process.

According to a further improvement, the lenses may be pressed or cast together with the mountings when a transparent material is used. This is especially advantageous for spectacles or goggles used for the protection of eyes against intensive light rays or against particles of matter and if the glasses are to have a certain tint.

The spectacles made according to the invention therefore provide great advantages for the wearer together with possibilities of easy and efficient manufacturing.

In the spectacles according to Figs. 1 to 9 already described, the molecularly orientated resilient portions are integrally incorporated in the spectacle frames between the rims and the temples to give the requisite hinge-connections. Instead, these portions may be provided in individual hinges adapted to be connected to the rims; and they may either be integrally incorporated in the temples or separate parts adapted to be connected to the temples. Examples of such spectacles and hinges will now be described with reference to Figs. 10 to 21.

Referring to Figs. 10 and 11, the spectacle frame therein shown comprises as usual a pair of lens rims 13, a bridge 14 between them and a pair of sidepieces or temples 15 hinge-connected to the associated lens rims 13. These components 13, 14 and 15 may be of any appropriate form or construction and of plastic or any appropriate material.

In the example, each hinge-connection is effected by use of a hinge according to the invention which is made of a plastic capable of molecular orientation as hereinbefore described. Each hinge shown consists of terminal portions 16 and 17 and a central intermediate portion 18. The portions 16 and 17 are stiff and substantially molecularly unorientated, being used for joining the hinge to the components 13 and 15 which are hinge-connected. The central portion 18 is molecularly orientated, being reduced by cold working to the cross-sectional shape of a narrow strip ensuring that the strong resilient portion 18 will constrain the temples 15 to folding about the portions 18 in a horizontal plane.

In the example, the terminal portions 16, 17 are dovetailed in cross-section and fit tightly into counterpart grooves in the rims 13 and temples 15 of the spectacle frame. The terminal portions may be finally secured to the rims and temples in any appropriate way, for instance by means of small rivets or screws (not shown), or by the use of a suitable adhesive, or by previously heating only the hinge-connected components 13 and 15 or both pairs of parts 13, 16 and 15, 17 and welding them together.

The intermediate portion 18 of a hinge of this form may be cold worked to give the required molecular orientation by pressing or rolling a plastic strip.

Fig. 12 shows an alternative arrangement, in which one terminal portion 19 of each hinge 16, 18, 19 is merged integrally into a temple 15 of the spectacles. That is to say, each hinge 16, 18, 19 is an extension of a temple 15, the whole being composed of a plastic capable of molecular orientation by cold working although only the intermediate portion 18 is cold worked.

Figs. 13, 14 and 15 show a hinge made out of a plastic wire or rod of circular cross-section. The final hinge consists of terminal portions 20 of circular cross-section, each with a collar 21. The portions 20 are left substantially unorientated. By cold working the wire or rod between the collars there is formed a strong and flexible linearly orientated central portion 22 having a narrowed strip form. Hinges of this kind are fixed to the components to be hinge-connected, for instance in the way shown in Figs. 16 and 17 as applied to spectacle frames. The terminal portions 20 are inserted into circular bores in the rims 13 and temples 15, and on each of the protruding ends a rivet head 23 is formed. In order to prevent turning of the circular portions 20 in the bores, a small axial groove (not shown) may be formed in each bore, so that the material of each portion 20 will enter this groove when the rivet head 23 is formed. Alternatively, the portions 20 may be provided with small projections, and the components 13 and 15 may be pre-heated, so that said projections will be forced like keys into the hot material and thus lock the portions 20 in the bores. Alternatively, either the terminal portions 20 or the bores may be slightly tapered and the components 13 and 15 pre-heated, the portions 20 being pressed into the bores so that the hot material of the components is squeezed to fit the portions 20, which thus fill the bores completely and are tightly gripped after cooling takes place.

In this example, the extremities of the rims 13 and adjoining temples 15 abut, where indicated by the arrow A in Fig. 16, in the open or unfolded position of the temples.

Hinges according to the invention (whether or not incorporating an integral temple as in Fig. 12) may be made by applying pressure to the plastic, which may conveniently be in the form of a wire, so as to compress and mould it to the desired form, simultaneously displacing the material of the intermediate portion in order to molecularly orientate it and give it the requisite resiliency and strength.

Figs. 18 and 19 show a hinge having the rather conventional form of customary metal hinges for general use with countersunk holes 24 for fastening screws to be inserted through flat plate-like portions 25. In the example, the entire hinge is composed of plastic, as hereinbefore described, and the portion 26 intermediate the terminal portions 25 is cold worked so as to be molecularly orientated. The orientation may be effected by applying pressure and by so displacing the material along the centre line of a plastic strip out of which the entire hinge is formed. Such a hinge may be of substantial length and may provide a dustproof or waterproof joint for two hinge-connected parts.

Figs. 20 and 21 show an alternative form of a hinge of the same kind, corresponding parts having the same reference numerals.

I claim:

1. A method of manufacturing a frame for spectacles comprising moulding the rims, bridge and temples as an integral unit from a synthetic linear high molecular material permitting molecular orientation by cold working and cold working a portion of each temple at the rim, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

2. A method of manufacturing a frame for spectacles comprising moulding the rims, bridge and temples from a synthetic linear high molecular material permitting molecular orientation by cold working as an integral unit in substantially one plane, bending the temples to an in-use position substantially normal to the plane of the rims, and cold working a portion of each temple at the rims, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

3. The method claimed in claim 2, in which the cold working is effected by pressing said portions.

4. A method of manufacturing a frame for spectacles comprising moulding the rims, bridge and temples from a synthetic linear high molecular material permitting molecular orientation by cold working as an integral unit in substantially one plane, bending the temples to an in-use position substantialy normal to the plane of the rims, and cold working a portion of each temple at the rim by rolling said portion flat in a plane substantially normal to the plane containing the temples, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

5. A method of manufacturing a frame for spectacles comprising moulding the rims, bridge and temples from a synthetic linear high molecular material permitting molecular orientation by cold working to form an integral unit in substantialy one plane, bending the temples under heat to an in-use position substantially normal to the plane of the rims, and cold working a portion of each temple at the rim by twisting said portion upon itself and about its longitudinal axis, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

6. The method according to claim 5, in which each of said portions is formed, during moulding, as a plurality of co-planar strips.

7. A method of manufacturing a frame for spectacles comprising moulding the rims, bridge and temples as an integral unit from a synthetic linear condensation polymer, and cold working a portion of each temple at the rim, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

8. A method of manufacturing a frame for spectacles comprising moulding the rims, bridge and temples as an integral unit from a polymer permitting molecular orientation by cold working, and cold working a portion of each temple at the rim, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

9. A method of manufacturing a frame for spectacles comprising moulding the rims, bridge and temples as a unit from a substance in the groups comprising condensation polymers and pure polymers permitting molecular orientation by cold working, and cold working a portion of each temple at the rim, whereby molecular orientation in said portions is effected and their strength and resiliency is increased, so that said portions provide sufficient strength and resiliency to cause the temples to grip the head of the wearer, and to permit the temples to be folded inwards to a substantially flat position when out-of-use.

10. A method of manufacturing a hinge composed of a plastic material capable of molecular orientation by cold working, said method consisting in forming a body of said material to have terminal portions and an intermediate portion merging integrally into said terminal portions, and said method including the step of cold working said intermediate portion so as to molecularly orientate it and give it added strength and resiliency while leaving said terminal portions substantially rigid and pivotable about said intermediate portion as axis.

11. A method of manufacturing a hinge composed of a plastic material capable of molecular orientation by cold working, said method consisting in compressing a body of said material to mould in it terminal portions and an intermediate portion merging integrally into said terminal portions, the work of compression including the step of displacing and elongating the material of said intermediate portion so as to molecularly orientate it and give it added strength and resiliency while leaving said terminal portions substantially rigid and pivotable about said intermediate portion as axis.

12. A method of manufacturing a hinge from a wire composed of a plastic material capable of molecular orientation by cold working, said method consisting in forming the wire into terminal portions and an intermediate portion merging integrally into said terminal portions, and said method including the step of cold working said intermediate portion so as to flatten it in cross-section and molecularly orientate it lengthwise and thus give it added strength and resiliency while leaving said terminal portion substantially rigid and pivotable about said flattened intermediate portion.

13. A method of manufacturing a hinge from a strip of plastic material, capable of molecular orientation by cold working, said method consisting in forming said strip with terminal portions and an intermediate portion merging integrally into said terminal portions, and said method including the step of cold working said intermediate portion to elongate it and reduce it in cross-section so as to molecularly orientate it and give it added strength and resiliency while leaving said terminal portions substantially rigid and pivotable about said reduced-section intermediate portion.

References Cited in the file of this patent

UNITED STATES PATENTS

| | | |
|---|---|---|
| 327,145 | De Ferranti | Sept. 29, 1885 |
| 502,782 | Spencer | Aug. 8, 1893 |
| 2,130,948 | Carothers | Sept. 20, 1938 |
| 2,244,208 | Miles | June 3, 1941 |
| 2,331,512 | Siedschlag | Oct. 12, 1943 |

FOREIGN PATENTS

| | | |
|---|---|---|
| 854,770 | France | Jan. 24, 1940 |
| 928,486 | France | June 2, 1947 |